(12) United States Patent
Janssen et al.

(10) Patent No.: US 6,393,079 B1
(45) Date of Patent: May 21, 2002

(54) TRANSIENT-SUPPRESSING MODE SWITCH

(75) Inventors: John J. Janssen, Round Lake Beach; James C. Baker, Crystal Lake; John P. Oliver, Chicago, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/124,200

(22) Filed: Jul. 28, 1998

(51) Int. Cl.$^7$ .................................................. H04B 1/10
(52) U.S. Cl. ........................................ 375/351; 455/550
(58) Field of Search ................................ 375/217, 324, 375/328, 351, 295, 285, 346; 327/310, 379, 365, 384, 551; 379/421, 422; 381/94.1, 94.5; 455/212, 422, 218, 222, 223, 225, 91, 403, 550

(56) References Cited

U.S. PATENT DOCUMENTS

| | | | |
|---|---|---|---|
| 5,175,619 A | * 12/1992 | Willis | 348/448 |
| 5,418,619 A | * 5/1995 | Wedam et al. | 386/9 |
| 5,550,868 A | * 8/1996 | Boccuzzi | 375/330 |
| 5,621,763 A | 4/1997 | Walczak et al. | |
| 5,777,991 A | * 7/1998 | Adachi et al. | 370/352 |
| 5,808,750 A | * 9/1998 | Yang et al. | 386/84 |
| 5,822,018 A | * 10/1998 | Farmer | 348/705 |
| 5,822,490 A | * 10/1998 | Strolle | 386/1 |
| 5,978,546 A | * 11/1999 | Abe et al. | 386/124 |
| 6,058,304 A | * 5/2000 | Callaghan et al. | 455/422 |
| 6,091,968 A | * 7/2000 | Koohgoli et al. | 455/557 |
| 6,108,041 A | * 8/2000 | Faroundja et al. | 348/446 |
| 6,253,022 B1 | * 6/2001 | Strolle et al. | 386/109 |

* cited by examiner

*Primary Examiner*—Chi Pham
*Assistant Examiner*—Emmanuel Bayard
(74) *Attorney, Agent, or Firm*—Sylvia Y. Chen; Roland K. Bowler

(57) ABSTRACT

A transient-suppressing mode switch (100) uses a state machine (120) in conjunction with a soft switch (114) to control a first mode signal sent from a first mode signal source (112) to a first soft switch input and a second mode signal from a second mode signal source (130) to a second soft switch input. When switching from a first mode to a second mode, the state machine delays the transition of the second mode signal from a constant zero value to a non-zero value until after the amplitude of the first mode signal at the first soft switch input has decayed to a sufficiently small value in order to reduce transients caused by switching.

20 Claims, 2 Drawing Sheets

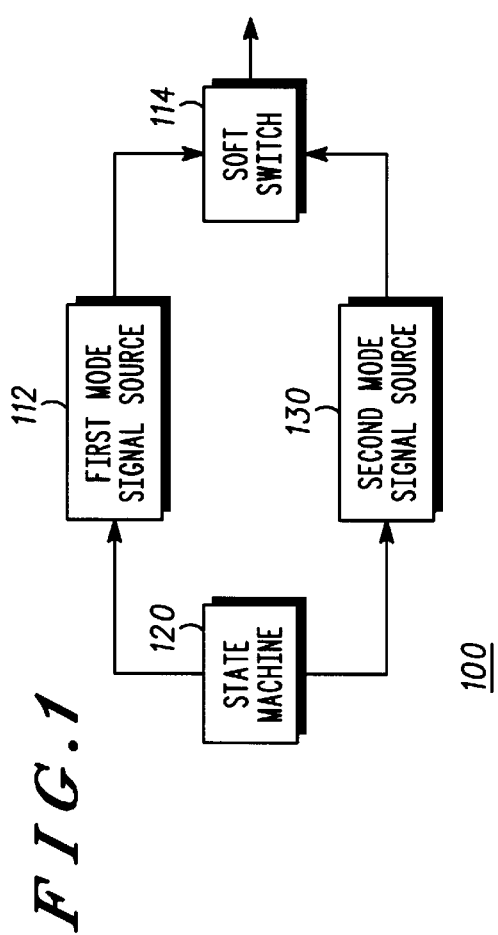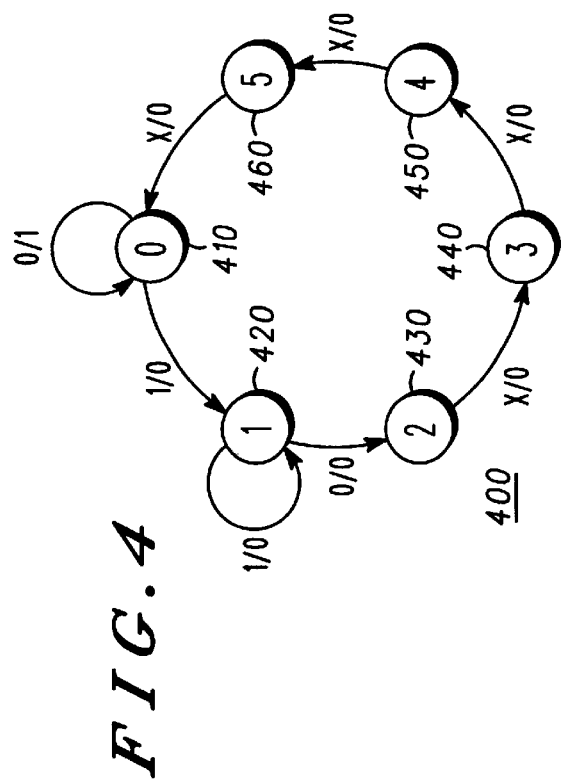

TRANSIENT-SUPPRESSING MODE SWITCH

CROSS REFERENCE TO RELATED APPLICATIONS

This application is related to U.S. patent application Ser. No. 09/124,208, now U.S. Pat. No. 6,144,862 filed by John P. Oliver et al. on even date herewith and entitled "Pulse-Shaping Look-Up Table with Transient Suppression." The related application is assigned to the assignee of the present application and is hereby incorporated herein in its entirety by this reference thereto.

FIELD OF THE INVENTION

This invention relates generally to switching between at least two input modes and reducing transients caused by the switchover process.

BACKGROUND OF THE INVENTION

Often in digital signal processing applications, it is necessary to switch between different input modes. One method of switching is called hard switching. Hard switching disconnects a first input signal before connecting a second input signal; this is colloquially called "break-before-make" switching. This method has the disadvantage of potentially causing a large transient to occur at the output of the switch, because the signal at one or more inputs to the switch may not be a zero value at the time of the switchover due to network delay. If the output of the switch is sent to a device such as a modulator in a transmitter of a cellular radiotelephone, the hard switching transient could cause the spectral emission of the cellular radiotelephone to be unacceptable to the cellular system.

Another method of switching between input modes, called soft switching, avoids the hard switching transient; however, the output of the switch may be an overflow condition which causes a soft switching transient. During soft switching, the input signals are summed at the switch, and switching is accomplished by setting all but one of the input signals to a constant zero value. Circuit delay, however, can cause more than one signal to be a non-zero value at the switchover time, and the summed value at the output of the switch might exceed acceptable levels. For example, if the output of the switch is a digital number, soft switching can cause wrapping of a value that exceeds the highest allowable digital number over to a low digital number. Wrapping can result in soft switching transients that are as bad as or worse than hard switching transients.

In cellular radiotelephone transmitter applications, when switching between input speech and data modes, most any kind of switching transient will result in unacceptable spectral emissions. In a cellular radiotelephone transmitter application, the output of the switch enters a modulator and the modulated data signal does not normally pass through a limiting or splatter filter before being transmitted. Thus, any interaction between the first input mode and the second input mode will directly affect the modulator output. There is a need for a method of switching that avoids the transients caused by hard switching and soft switching.

BRIEF DESCRIPTION OF THE DRAWINGS

FIG. 1 shows a block diagram overview of a transient-suppressing mode switch according to a preferred embodiment.

FIG. 3 shows a preferred embodiment of the audio transmit state machine shown in FIG. 2.

FIG. 4 shows a preferred embodiment of the data register state machine shown in FIG. 2.

DETAILED DESCRIPTION OF THE PREFERRED EMBODIMENTS

Figure 2:
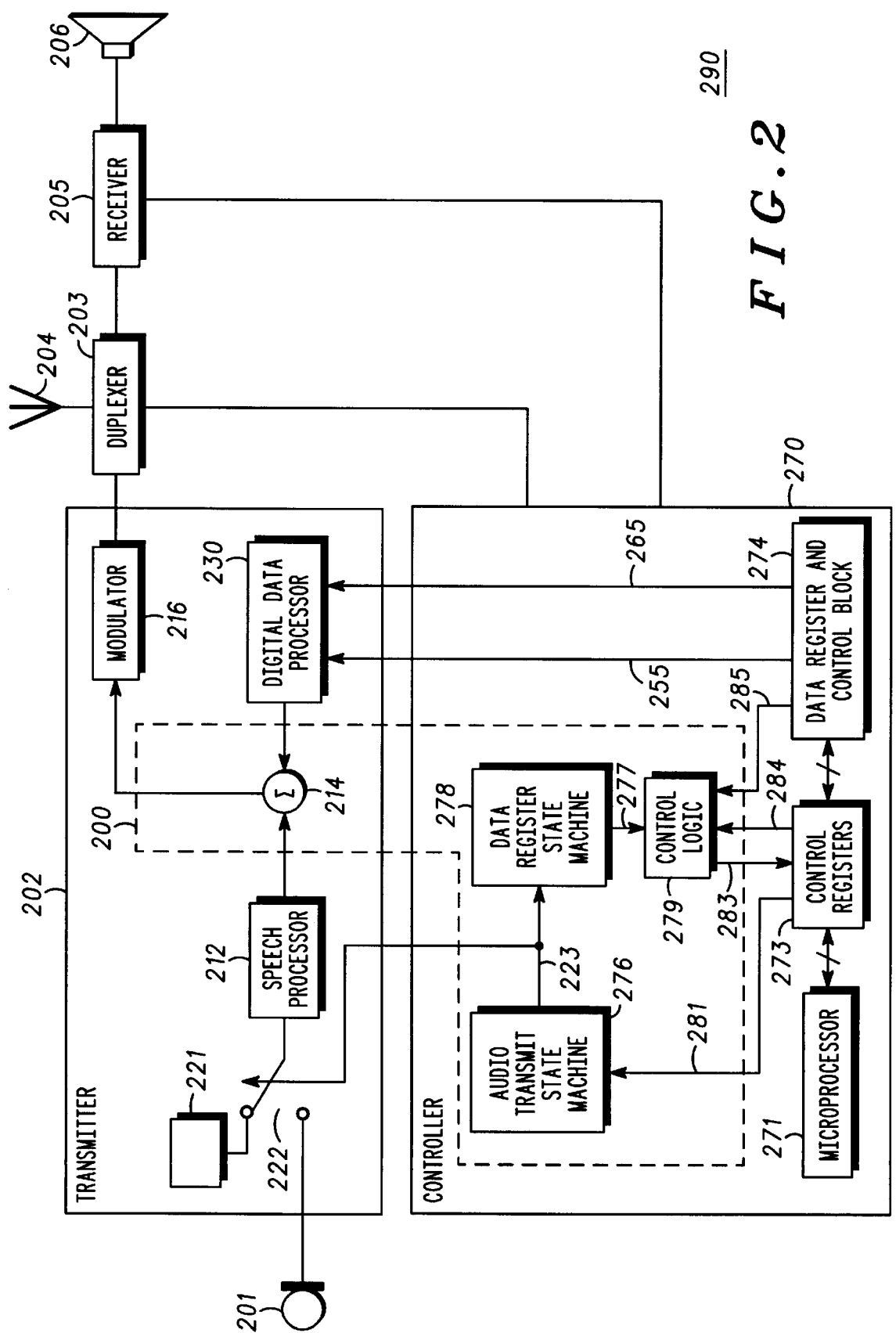
FIG. 2 shows a block diagram of a transient-suppressing mode switch as implemented in a radiotelephone according to a preferred embodiment.

The transient-suppressing mode switch reduces transients caused by switching using a state machine in conjunction with a soft switch to control transitions from a constant zero-value signal to a non-zero-value signal at the soft switch inputs. When switching from a first input mode to a second input mode, the state machine control delays the transition of a second mode signal from a constant zero value to a non-zero value at the second soft switch input until after the amplitude of the first mode signal at the first soft switch input has decayed to a sufficiently small value. Likewise, when switching from the second mode to the first mode, the state machine control delays the transition of the first mode signal from a constant zero value to a non-zero value at the first soft switch input until after the amplitude of the second mode signal at the second soft switch input has decayed to a sufficiently small value.

FIG. 1 shows a block diagram overview of a transient-suppressing mode switch 100 according to a preferred embodiment. In this preferred embodiment, a soft switch 114 receives a first mode signal from a first mode signal source 112 and a second mode signal from a second mode signal source 130. The selection of an input mode by the soft switch 114 is achieved by setting all but one input signal to a constant zero value. The lone non-zero-value input signal is thus selected as the output of the soft switch 114. The soft switch 114 can have more than two inputs, however, only one signal at a time can have a non-zero value. A state machine 120 controls the first mode signal source 112 and the second mode signal source 130 such that transients are reduced. Namely, the state machine 120 does not allow the first mode signal source 112 to send a non-zero-value signal to the soft switch 114 until after a non-zero-value signal from the second mode signal source 130 has decayed to a sufficiently small value, and vice versa.

FIG. 2 shows a block diagram of a transient-suppressing mode switch 200 as implemented in a cellular radiotelephone 290 according to a preferred embodiment. The cellular radiotelephone 290 has a microphone 201 attached to a transmitter 202. When switch 222 is connected between the microphone 201 and a speech processor 212, the speech processor 212 processes audio signals from the microphone 201 and creates an output digital speech signal. A digital data processor 230 in the transmitter 202 processes data signals on line 255 and mode signals on line 265 from a controller 270 and produces an output digital data signal. Data signals from the controller 270 can include call set-up, power control, and hand-off control signals generated by the controller 270 as well as other data.

The transient-suppressing mode switch 200 selects either the digital speech signal from the speech processor 212 or the digital data signal from the digital data processor 230 for modulation by a modulator 216. The transmitter 202 is connected to a duplexer 203 with an antenna 204. Transmitted signals are broadcast from the antenna 204 and received by a counterpart receiver in a device such as a cellular base station (not shown). Signals received by the antenna 204 are sent by the duplexer 203 to a receiver 205 connected to a speaker 206.

In this radiotelephone application of the transient-suppressing mode switch, the first mode is a speech mode, the first mode signal is a digital speech signal containing audio information from the microphone 201, and the first mode signal source is the speech processor 212. The second mode is a digital data mode, the second mode signal is a digital data signal carrying data such as hand-off control, power control, and call set-up instructions generated by the controller 270, and the second mode signal source is the digital data processor 230. The transient-suppressing mode switch 200 can be implemented in various transmitters that use more than one mode, such as cellular base stations and cordless telephones, in addition to the cellular radiotelephone application shown here. The application shows a device having two modes, however, the transient-suppressing mode switch can easily be adapted to devices with three or more modes. The transient-suppressing mode switch can also be used in analog transmitters to reduce clipping and signal over-deviation.

The controller 270 includes a microprocessor 271 for governing the interactions of the transmitter 202, duplexer 203, and receiver 205. The controller 270 also includes control registers 273, for controlling the transient-suppressing mode switch 200 and other components of the cellular radiotelephone 290, and a data register and control block 274, for controlling the digital data processor 230. The state machine control for the transient-suppressing mode switch 200 is also included in the controller 270.

The state machine control includes an audio transmit state machine 276 for controlling the digital speech signal to the soft switch, implemented as a summer 214, and a data register state machine 278 with control logic 279 for controlling the digital data signal to the soft switch. The other component of the transient-suppressing mode switch 200, the soft switch implemented as a summer 214, is located in the transmitter 202.

The audio transmit state machine 276 receives an audio transmit control signal on line 281 and controls the switch 222 input to the speech processor 212 using a delayed audio transmit control signal on line 223 so that either a non-zero-value signal or a constant zero-value signal from the constant zero-value signal generator 221 enters the summer 214 through the speech processor 212. The audio transmit state machine 276 may delay the control signal on line 223 relative to the audio transmit control signal on line 281 so that a non-zero-value signal from the speech processor 212 does not connect to the summer 214 while there is still a non-zero-value signal from the digital data processor 230 connected to the summer 214. Thus, the transient-suppressing mode switch 200 avoids transients caused by connecting a non-zero-value digital speech signal to the soft switch before a non-zero-value digital data signal has decayed to an acceptable low value.

By using a look-up table in the digital data processor 230 as disclosed in U.S. patent application Ser. No. 09/124,208, now U.S. Pat. No. 6,144,862 (Atty. Docket No. CE01843R) filed by John P. Oliver et al. entitled "Pulse-Shaping Look-Up Table with Transient Suppression," it is easy to determine the decay time of the digital data signal and consequently when it is safe to transmit digital speech signals without causing unacceptable transients.

The data register state machine 278 and control logic 279 control when data can be written from the control registers 273 to the data register and control block 274 and thus cause a non-zero-value output signal from the digital data processor 230. When the delayed audio transmit control signal on line 223 from the audio transmit state machine 276 goes low, which indicates that a constant zero-value signal from generator 221 is connected to the summer 214 through the speech processor 212, the data register state machine 278 and control logic 279 causes the control registers 273 to wait for a certain amount of time before allowing data to be written to the data register and control block 274. A delay caused by the data register state machine 278 allows any digital speech signals present at the input of the summer 214 to decay to a level that will not cause overflow or overdeviation in the modulator 216 when the digital data processor 230 starts producing non-zero-value signals.

Control logic 279 sends a data register empty interrupt request on line 283 to the control registers 273 only if the data register in the data register and control block 274 is empty as indicated by the signal on line 285 and either the radiotelephone is in narrowband mode as indicated by the narrowband control signal on line 284 or an data transmit ready interrupt request control signal on line 277 from the data register state machine 278 is high. Once the data register empty interrupt request is sent, the control registers 273 can either send an audio transmit control signal on line 281 or write data to the data register and control block 274.

The control registers 273 set a narrowband control signal to a high state on line 284 if the cellular radiotelephone 290 is in a mode that allows both speech and data to be sent simultaneously. This mode occurs in, for example, Narrowband Advanced Mobile Phone Service (NAMPS) cellular systems. This is because in NAMPS, the data signal deviation is low enough to allow transmission of combined data and audio. The narrowband control signal is low if speech and data cannot be sent simultaneously, such as in Advanced Mobile Phone Service (AMPS) systems.

FIG. 3 shows a preferred embodiment of the audio transmit state machine shown in FIG. 2. The audio transmit state machine 300 has eight states 310, 320, 330, 340, 350, 360, 370, 380 each representing a 250 microsecond time period, with an input audio transmit control signal (represented by the binary number before the slash "/") from line 281 shown in FIG. 2 and an output delayed audio transmit control signal (represented by the binary number after the slash "/") to line 223 shown in FIG. 2. The time period of each state is selected based on the known decay time of a non-zero-value signal from the digital data processor. The state machine may reflect the worst-case or average decay time of the digital data signal.

State 0 310 is a state where the constant zero-value signal generator 221 is connected to the summer 214 through the speech processor 212 as shown in FIG. 2. If an audio transmit control signal on line 281 is low, indicating that the constant zero-value signal generator 221 should be connected to the summer 214 through the speech processor 212, the state machine 300 stays in state 0 310. If the audio transmit control signal on line 281 goes high, which reflects that there is a non-zero-value digital speech signal to be transmitted by the speech processor 212 shown in FIG. 2, the audio transmit state machine 300 progresses through states 1–5 320, 330, 340, 350, 360 as long as the signal on line 281 stays high. At state 6 370, the output audio delayed transmit control signal goes high and is held for at least one time period to ensure that it is properly received by the switch 222 and the data register state machine 278 shown in FIG. 2. The audio transmit state machine 300 stays in state 6 370 as long as the audio transmit control signal on line 281 stays high, which indicates that the non-zero-value speech signal from the speech processor 212 should continue to be connected to the summer 214 shown in FIG. 2.

After the audio transmit control signal on line 281 goes low, which indicates that the constant zero-value signal from the generator 221 should be connected to the summer 214 through the speech processor 212 shown in FIG. 2, the audio transmit state machine 300 progresses through state 7 380 regardless of the input signal value and returns to state 0 310, where the generator 221 is connected to the summer 214 through the speech processor 212. If at any time while the audio transmit state machine 300 is in one of states 1–5 320, 330, 340, 350, 360 and the audio transmit control signal on line 281 goes low, the state machine reverts immediately to state 0 310. Thus, the audio transmit state machine 300 traverses states 1–5 320, 330, 340, 350, 360 to insure that there is time for any non-zero-value data signals present at an input of the summer 214 to decay to an acceptable value before a non-zero-value signal from the speech processor 212 is coupled to the summer 214 in state 6 370.

FIG. 4 shows a preferred embodiment of the data register state machine shown in FIG. 2. The data register state machine 400 has six states 410, 420, 430, 440, 450, 460 each representing a 250 microsecond time period, with an input delayed audio transmit signal (represented by the binary number before the slash "/") from the audio transmit state machine 276 on line 223 and an output data transmit ready interrupt request control signal (represented by the binary number after the slash "/") to the control logic 279 on line 277 shown in FIG. 2. The time period of each state is selected based on the known decay time of a non-zero-value signal from the speech processor. The state machine may reflect the worst-case or average decay time of the digital speech signal.

State 0 410 is when the input delayed audio transmit control signal on line 223 shown in FIG. 2 is low and the output data transmit ready interrupt request control signal is high. When the delayed audio transmit signal on line 223 goes high (i.e., audio transmit state machine 300 is in state 6 370 shown in FIG. 3), the data transmit ready interrupt request goes low and the data register state machine 400 progresses to state 1 420. The data register state machine 400 stays in state 1 420 until the delayed audio transmit control signal goes low again. At this point, the data register state machine 400 progresses through states 2–5 430, 440, 450, 460 regardless of the input signal value before returning to state 0 410 and again sets high the output data transmit ready interrupt request control signal.

Control logic 279 shown in FIG. 2 allows a non-zero value from the speech processor 212 to be connected to the summer 214 only if the data register in data register and control block 274 is empty as indicated by the signal on line 285 and either the narrowband control signal on line 284 is high or the data transmit ready interrupt request control signal on line 277 is high (i.e., the data register state machine 400 is in state 0 410).

Thus, the data register state machine 400 traverses states 2–5 430, 440, 450, 460 to insure that if simultaneous speech and data transmission is not available, there is time for any non-zero-value speech signals present at an input of the summer 214 to decay to an acceptable value before the control registers 273 can put data in the data register and control block 274.

The transient-suppressing mode switch can be modified to select between two or more other types of input modes, such as switching between two analog input modes or switching between two digital input modes. The transient-suppressing mode switch can also be modified to select between more than two input modes.

The transient-suppressing mode switch uses state machine control to assure that switching between input signals does not cause unacceptable transients at an output of a switch. While specific components and functions of the transient-suppressing mode switch are described above, fewer or additional functions could be employed by one skilled in the art within the true spirit and scope of the present invention. The invention should be limited only by the appended claims.

We claim:

1. A transient-suppressing mode switch comprising:

a soft switch;

a first mode signal source, coupled to a first input of the soft switch, for providing a first mode signal to the soft switch;

a second mode signal source, coupled to a second input of the soft switch, for providing a second mode signal to the soft switch; and a state machine, coupled to the first mode signal source and the second mode signal source, for controlling the first mode signal source and the second mode signal source such that the first mode signal transitions from a constant zero-value signal to a non-zero-value signal at least a predetermined amount of time after the second mode signal transitions from a non-zero-value signal to a constant zero-value signal.

2. A transient-suppressing mode switch according to claim 1 wherein the first mode signal is a digital signal.

3. A transient-suppressing mode switch according to claim 1 wherein the second mode signal is a digital signal.

4. A transient-suppressing mode switch according to claim 1 wherein the first mode signal source is a speech processor.

5. A transient-suppressing mode switch according to claim 1 wherein the second mode signal source is a digital data processor.

6. A transient-suppressing mode switch according to claim 1 wherein the state machine comprises:

a first state machine for controlling the first mode signal source; and a second state machine, coupled to the first state machine, for controlling the second mode sign al source.

7. A transient-suppressing mode switch according to claim 6 wherein the second state machine is coupled to control logic.

8. A transient-suppressing mode switch according to claim 7 wherein the control logic is coupled to the second mode signal source.

9. A radiotelephone comprising:

a transmitter having a modulator;

a soft switch coupled to the modulator;

a first mode signal source, coupled to a first input of the soft switch, for providing a first mode signal to the soft switch;

a second mode signal source, coupled to a second input of the soft switch, for providing a second mode signal to the soft switch; and a state machine, coupled to the first mode signal source and the second mode signal source, for controlling the first mode signal source and the second mode signal source such that the first mode signal transitions from a constant zero-value signal to a non-zero-value signal at least predetermined amount of time after the second mode signal transitions from a non-zero-value signal to a constant zero-value signal.

10. A radiotelephone according to claim 9 wherein the first mode signal source is a speech processor.

11. A radiotelephone according to claim 10 wherein the first mode signal is a digital speech signal.

12. A radiotelephone according to claim 11 wherein the second mode signal source is a digital data processor.

13. A radiotelephone according to claim 12 wherein the second mode signal is a digital data signal.

14. A radiotelephone according to claim 13 wherein the state machine comprises:
   an audio transmit state machine for controlling the speech processor; and
   a data register state machine, coupled to the audio transmit state machine, for controlling the digital data processor.

15. A radiotelephone according to claim 14 wherein the data register state machine is coupled to control logic.

16. A radiotelephone according to claim 15 wherein the control logic is coupled to control registers.

17. A radiotelephone comprising:
   a transmitter having:
      a soft switch having at least a first input, a second input, and an output;
      a modulator, coupled to the output of the soft switch;
      a speech processor, coupled to the first input of the soft switch, for transmitting a digital speech signal to the soft switch; and
      a digital data processor, coupled to the second input of the soft switch, for transmitting a digital data signal to the soft switch; and a controller having:
         an audio transmit state machine, coupled to the speech processor, for transitioning the digital speech signal from a constant zero-value signal to a non-zero-value signal;
         a data register state machine, coupled to the audio transmit state machine; and
         control logic, coupled to the data register state machine and the digital data processor, for transitioning the digital data signal from a constant zero-value signal to a non-zero-value signal.

18. A mobile wireless communication device with a transient-suppressing switch comprising:
   a plurality of at least two signal sources each having a corresponding signal output;
   a soft switch having an output, the soft switch having a plurality of signal inputs each coupled to a corresponding one of the plurality of signal outputs of the plurality of signal sources;
   a state machine having a plurality of signal source controlling outputs each coupled to a corresponding one of the plurality of signal sources.

19. The mobile wireless communication device of claim 18, the state machine for controlling the plurality of signal sources so that not more than one of the signal outputs provides a signal to the soft switch until signals of the other signal outputs are at a level that will not provide an unacceptable transient response at the soft switch output.

20. The mobile wireless communication device of claim 18, one of the plurality of signal sources is a first mode signal source, another of the plurality of signal sources is a second mode signal source different than the first mode signal source.

* * * * *